(12) United States Patent
Krauss et al.

(10) Patent No.: US 6,422,077 B1
(45) Date of Patent: Jul. 23, 2002

(54) ULTRANANOCRYSTALLINE DIAMOND CANTILEVER WIDE DYNAMIC RANGE ACCELERATION/VIBRATION/PRESSURE SENSOR

(75) Inventors: Alan R. Krauss, Naperville; Dieter M. Gruen, Downers Grove; Michael J. Pellin, Naperville; Orlando Auciello, Bolingbrook, all of IL (US)

(73) Assignee: The University of Chicago, Argonne, IL (US)

( * ) Notice: Subject to any disclaimer, the term of this patent is extended or adjusted under 35 U.S.C. 154(b) by 0 days.

(21) Appl. No.: 09/543,992

(22) Filed: Apr. 6, 2000

(51) Int. Cl.$^7$ .............................................. G01P 15/08
(52) U.S. Cl. ................. 73/514.25; 73/514.27; 73/514.36; 73/723; 73/105
(58) Field of Search .................. 73/514.16, 514.25, 73/514.26, 514.27, 514.32, 514.36, 651, 653, 723, 724

(56) References Cited

U.S. PATENT DOCUMENTS

| | | | | |
|---|---|---|---|---|
| 5,453,628 A | * | 9/1995 | Hartsell et al. ............... | 73/724 |
| 5,679,895 A | * | 10/1997 | Von Windheim ......... | 73/714.25 |
| 5,729,074 A | * | 3/1998 | Shiomi et al. ............... | 310/329 |
| 5,886,265 A | * | 3/1999 | Chatrefou ..................... | 73/651 |
| 6,132,278 A | * | 10/2000 | Kang et al. ................... | 445/14 |

* cited by examiner

Primary Examiner—John E. Chapman
(74) Attorney, Agent, or Firm—Emrich & Dithmar

(57) ABSTRACT

An ultrananocrystalline diamond (UNCD) element formed in a cantilever configuration is used in a highly sensitive, ultra-small sensor for measuring acceleration, shock, vibration and static pressure over a wide dynamic range. The cantilever UNCD element may be used in combination with a single anode, with measurements made either optically or by capacitance. In another embodiment, the cantilever UNCD element is disposed between two anodes, with DC voltages applied to the two anodes. With a small AC modulated voltage applied to the UNCD cantilever element and because of the symmetry of the applied voltage and the anode-cathode gap distance in the Fowler-Nordheim equation, any change in the anode voltage ratio V1/N2 required to maintain a specified current ratio precisely matches any displacement of the UNCD cantilever element from equilibrium. By measuring changes in the anode voltage ratio required to maintain a specified current ratio, the deflection of the UNCD cantilever can be precisely determined. By appropriately modulating the voltages applied between the UNCD cantilever and the two anodes, or limit electrodes, precise independent measurements of pressure, uniaxial acceleration, vibration and shock can be made. This invention also contemplates a method for fabricating the cantilever UNCD structure for the sensor.

15 Claims, 7 Drawing Sheets

ULTRANANOCRYSTALLINE DIAMOND CANTILEVER WIDE DYNAMIC RANGE ACCELERATION/VIBRATION/PRESSURE SENSOR

FIELD OF THE INVENTION

This invention relates generally to ultranocrystalline diamond (UNCD) structures and is more particularly directed to UNCD structures for use in sensors and other devices with special application for highly sensitive, ultra-small devices such as used in micro electro mechanical systems.

BACKGROUND OF THE INVENTION

Micro electro mechanical systems (MEMS) cantilever sensors are used as detectors in shock and acceleration sensors. One common application of a MEMS detector is in the activation of air bags in vehicles. The MEMS detector is typically made of silicon because of the availability of surface micromachining technology. However, these devices have limited dynamic range because of the limited flexural strength of silicon. If the cantilever deflection exceeds the elastic limit of silicon, the cantilever structure breaks. Moreover, the tribological properties of silicon are such that it has a tendency to adhere to surfaces with which the cantilever beam comes into contact. In addition, the silicon is subject to high friction and wear in applications involving sliding and rolling contact. Because of these characteristics of silicon, these cantilever structures are normally limited to simple on-off switches such as in the aforementioned vehicular air bag application, rather than having application to a broad range of measurement devices.

The present invention addresses the aforementioned limitations of the prior art by providing a miniature, highly sensitive ultranocrystalline diamond structure for use in a sensor having a wide dynamic range which is adapted for use in a wide range of applications.

OBJECTS AND SUMMARY OF THE INVENTION

Accordingly, it is an object of the present invention to provide an ultranocrystalline diamond (UNCD) structure for use in sensors and other devices such as in micro electro mechanical systems (MEMS).

It is another object of the present invention to provide an ultra-small sensor, and a method of fabrication therefor, for precisely measuring acceleration, shock, vibration and static pressure over a wide dynamic range.

A further object of the present invention is to provide a highly sensitive, miniature sensor and associated circuitry which is particularly adapted for use in atomic force microscopy.

Yet another object of the present invention is to provide a sensor having a wide dynamic range which can be used in a wide variety of applications such as in, for example, explosive shock sensors, pressure/vibration transducers for aircraft and space vehicles, acceleration sensors/feedback devices for air and ground vehicles, and data-logging applications.

A still further object of the present invention is to provide a sensor capable of the simultaneous detection of and discrimination between vibration and acceleration.

The present invention contemplates a sensor for measuring an acceleration, vibration or pressure, the sensor comprising a substrate having a general flat surface; an ultranocrystalline diamond (UNCD) element having first and second opposed ends, wherein said UNCD element undergoes deflection from an equilibrium position in response to acceleration, vibration or pressure; a mounting member disposed between and coupled to the substrate and the first end of the UNCD element for attaching the UNCD element to the substrate in a cantilever manner, wherein the second opposed end of the UNCD element is deflected from the equilibrium position toward or away from the substrate in response to an acceleration, vibration or pressure; and a detector coupled to the UNCD element for measuring deflection of the UNCD element from the equilibrium position, wherein the deflection represents an acceleration, vibration or pressure experienced by the UNCD element.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Diamond is a superhard material of high mechanical strength and thermal stability. Table I presents a comparison of selected properties of silicon and diamond. From Table I, it can be calculated that the projected wear life of diamond micro electro mechanical systems-moving mechanical assemblies (MEMS-MMAs) is on the order of 10,000 times greater than that of silicon. Studies of the tribo-oxidative properties of diamond indicate that diamond may perform significantly better than silicon and SiC in applications involving sliding/rolling contact in oxygen-containing atmospheres at temperatures up to 950° C. However, as the hardest known material, diamond is notoriously difficult to fabricate. Thin film methods offer a logical approach to the fabrication of ultra-small diamond structures, but conventional chemical vapor deposition (CVD) methods produce diamond films having large grain size, high internal stress, poor intergranular adhesion, and very rough surfaces. As a result, conventionally produced diamond films are unsuited for MEMS applications.

TABLE I

| Property | Silicon | Diamond |
| --- | --- | --- |
| Lattice Constant (Å) | 5.43 | 3.57 |
| Cohesive Energy (eV) | 4.64 | 7.36 |
| Young's Modulus (Gpa) | 130 | 1200 |
| Sheer Modulus (Gpa) | 80 | 577 |
| Hardness, Hv (kg/mm2) | 1000 | 10,000 |
| Fracture Toughness | 1 | 5.3 |
| Flexural Strength (Mpa) | 127.6 | 2944 |

The present invention employs phase-pure ultrananocrystalline diamond (UNCD) having morphological and mechanical properties that are ideally suited for MEMS applications. In particular, recent morphological studies and pseudopotential calculations indicate that UNCD has a flexural strength equal to that of single crystal diamond, and a brittle fracture toughness considerably higher than that of conventionally grown diamond films, and may even exceed the fracture toughness of single crystal diamond. UNCD is characterized as having much smaller grain size than conventional nanocrystalline diamond (NCD) structures, with only diamond and no voids or non-diamond components between grains. In addition, UNCD is free of secondary phases and is defined by sharp grain boundaries giving rise to high fracture strength.

Also as shown in Table I, the flexural strength of diamond is 23 times greater than that of silicon, permitting much greater forces to be applied to the cantilever element without breakage. If the diamond should contact the substrate to which it is mounted, its low coefficient of static friction ensures that the diamond cantilever element will not stick to the substrate. This permits UNCD cantilever elements to be used as measuring devices for shock, vibration, pressure and acceleration.

Figure 1:
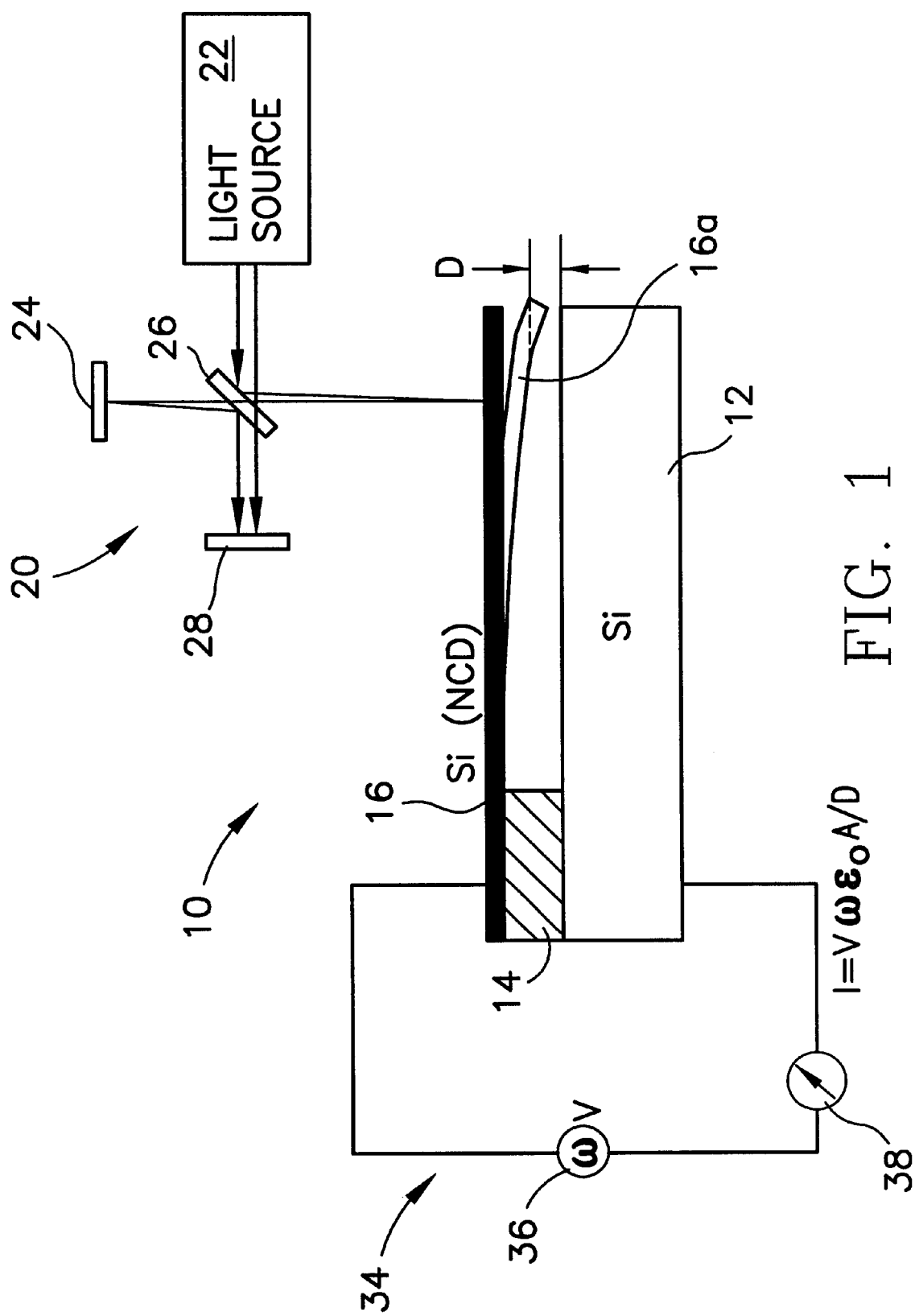
FIG. 1 is a simplified combined block and schematic diagram of an ultranocrystalline diamond cantilever sensor arrangement in accordance with one embodiment of the present invention shown in combination with both an interferometric measurement arrangement and an electrical circuit measurement arrangement.

Referring to FIG. 1, there is shown a simplified combined schematic and block diagram of one embodiment of an UNCD sensor arrangement 10 in accordance with the present invention. The UNCD sensor 10 includes a silicon substrate 12 to which is attached an UNCD cantilever element 16 by means of an insulating layer 14. With the UNCD cantilever element 16 and silicon substrate 12 separated by the insulating layer 14, the capacitance between the UNCD cantilever element and silicon substrate is a function of the average distance between the cantilever element and the substrate. The UNCD cantilever element 16 is in the form of an elongated, linear structure securely attached at one end thereof to the silicon substrate 12 by means of the insulating layer 14. Insulating layer 14 is preferably comprised of a thermally oxidized silicon wafer. In response to an acceleration, vibration or the application of a pressure or shock wave, the free end 16a of the UNCD cantilever element 16 is displaced toward the silicon substrate 12. D is the distance from the substrate. The free end of the UNCD cantilever element 16 may also be displaced away from the silicon substrate 12, although this is not shown in the figure for simplicity.

As shown in FIG. 1, connected between the silicon substrate 12 and the UNCD cantilever element 16 is an electrical detector circuit 34. Electrical detector circuit 34 includes an alternating current I voltage source 36 and an ammeter 38. Ammeter 38 detects the current I in the circuit which is given by the following expression:

$$I = V \omega \epsilon_o A / D \tag{1}$$

where V=voltage of the alternating current voltage source;
ω=frequency of the AC voltage;
$\epsilon_o$=dielectric constant of space;
A=the area of the cantilever; and
D=the average distance between the UNCD cantilever element and the silicon substrate.

Also shown in FIG. 1 is an optical detector arrangement including an interferometer 20 for measuring the deflection of the free end 16a of UNCD cantilever element 16. Interferometer 20 includes a light source 22, a beam splitter/compensator 26, and a fixed reflector 24. As the free end 16a of the UNCD cantilever element 16 is deflected in response to an acceleration, vibration or a pressure or shock wave, the phase of a light beam directed onto the UNCD cantilever element changes and is measured by a detector 28 which compares the phase of the light beam output by the light source 22 with the phase of the light beam reflected from the UNCD cantilever element.

UNCD is an excellent cold cathode electron emitter with a threshold field of 2–5 volts/micron. It is therefore possible to provide a bias voltage between the UNCD cantilever element and an anode in close proximity (10–100 μm) in order to measure the emission current. The UNCD electron emission current is given by the Fowler-Nordheim equation as follows:

$$J = A(V/D)^2 \exp(-BD/V) \tag{2}$$

where J=current density in amps/cm$^2$;
A and B=properties of the cold cathode material;
V=applied voltage; and
D=distance between the silicon substrate (anode) and the UNCD cantilever element (cathode).

Because the quantity D appears in the exponent of the Fowler-Nordheim equation, the emission current J is extremely sensitive to the gap between the silicon substrate and the UNCD cantilever element.

Referring to FIGS. 2a–2e, there is shown a series of steps involved in fabricating a UNCD cantilever sensor in accordance with another aspect of the present invention. In order to fabricate the UNCD cantilever structure, it is necessary to deposit the UNCD film on a sacrificial release layer such as of SiO$_2$. Using conventional diamond film growth methods, this is very difficult because the nucleation density is 6 orders of magnitude smaller on SiO$_2$ than on Si. However, the carbon dimer growth species in the UNCD process can insert directly into either the Si or SiO$_2$ surface. In addition, the lack of atomic hydrogen in the UNCD cantilever element fabrication process permits both a higher nucleation density and a higher renucleation rate than the conventional H$_2$—CH$_4$ plasma chemistry, and it is therefore possible to grow UNCD directly on SiO$_2$.

Figure 2A:
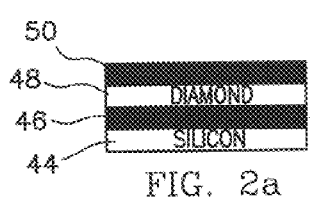
FIGS. 2a–2e illustrate the sequence of steps involved in fabricating a free-standing ultranocrystalline diamond cantilever sensor arrangement in accordance with one aspect of the present invention.
Figure 2B:
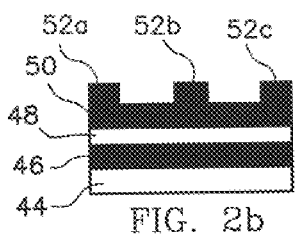
Figure 2C:
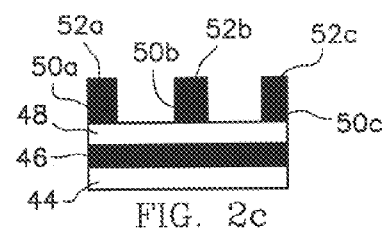
Figure 2D:
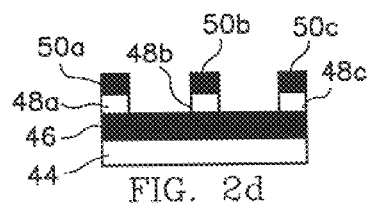
Figure 2E:
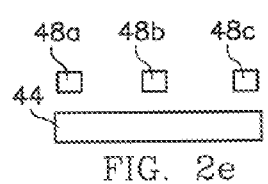

The process for fabrication of an UNCD cantilever structure in accordance with this aspect of the present invention is initiated as shown in FIG. 2a by forming a sacrificial layer 46 of thermally grown SiO$_2$ on a silicon substrate layer 44. An UNCD layer 48 is then deposited onto the 1 $\mu$m thick thermal oxide SiO$_2$ release layer 46. PECVD (Plasma Enhanced Chemical Vapor Deposition) is then used to form a SiO$_2$ hard mask layer 50 on the thin film UNCD layer 48. Photoresist is then deposited on the SiO$_2$ hard mask layer 50 and is formed by means of photolithography in plural, spaced photoresist deposits 52a, 52b and 52c on the SiO$_2$ hard mask layer 50 as shown in FIG. 2b. The SiO$_2$ hard mask layer 50 is then also formed in a pattern by means of fluorine dry etching so as to form plural spaced hard mask layer deposits 50a, 50b and 50c, disposed between the UNCD layer 48 and the photoresist deposits 52a, 52b and 52c respectively, as shown in FIG. 2c. The photoresist deposits 52a, 52b and 52c are removed and the UNCD layer 48 is etched between the hard mask layer deposits 50a, 50b and 50c by means of an oxygen plasma as shown in FIG. 2d. This forms plural, spaced UNCD deposits 48a, 48b and 48c. The hard mask layer deposits 50a, 50b and 50c and the sacrificial SiO$_2$ layer 48 are then removed by etching in HF, leaving cantilever UNCD structures in the form of spaced UNCD deposits 48a, 48b and 48c.

Figure 3A:
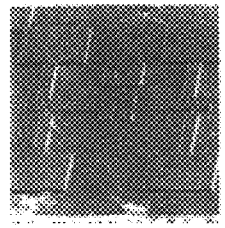
FIGS. 3a, 3b and 3c are electron micrographs of an ultranocrystalline micro electro mechanical system strain gauge fabricated in accordance with the aspect of the present invention shown in FIGS. 2a–2e.
Figure 3B:
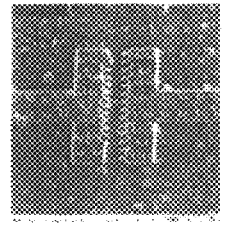
Figure 3C:
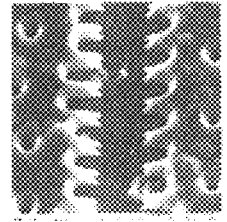

FIGS. 3a, 3b and 3c are photographs of another configuration of UNCD cantilever structures fabricated by the process shown in FIGS. 2a–2e. FIG. 3a shows two diamond cantilever structures deposited on a SiO$_2$ release layer which are arranged in facing relation on the release layer. The cantilever structures include a series of apertures to allow the HF etchant access to the sacrificial SiO$_2$ layer in order to free the cantilever elements from the substrate. The four large corner pads shown in FIG. 3a do not have these apertures and, because of their relatively large size, they remain attached to the substrate, with an undercut of approximately 7 $\mu$m.

Differential motion of the four pads at the corners of the device as shown in FIG. 3a is amplified by the offset support points along the arms of the cantilever elements, permitting the device to function as a MEMS strain gauge. FIGS. 3b and 3c show increasingly magnified views of the free end of the UNCD cantilever structures. The UNCD cantilever structures on the crossbar represent the scale of a vernier readout for a precise measurement of very small differential motion. Previous attempts at producing such diamond structures were limited by the attainable resolution, which was limited by the diamond grain size (typically≈1 $\mu$m). However, the feature size of the vernier scale in the figures is≈100 nm.

Figure 4:
FIG. 4 is an electron micrograph of a released nanocrystalline diamond cantilever structure for use in a sensor in accordance with the present invention.

An UNCD cantilever structure 58 formed as shown in FIGS. 2a–2e and as described above is shown in the photograph of FIG. 4. Unlike conventionally grown diamond, which is under considerable compressive stress and curls significantly, often into a tight spiral, when released from the substrate, UNCD thin films exhibit little interfacial stress. The released UNCD cantilever structure is therefore essentially straight as shown in FIG. 4. This lack of curl in the UNCD cantilever structure 58 suggests that the stress is accommodated by Type III (grain boundary) strain. The fabrication of the released UNCD cantilever structure 58 shown in FIG. 4 demonstrates that it is possible to produce stable 2-dimensional, free-standing UNCD structures using modified Si fabrication technologies. The released UNCD cantilever structure 58 exhibits excellent lateral stability and almost no vertical displacement resulting from interfacial stress.

Figure 5:
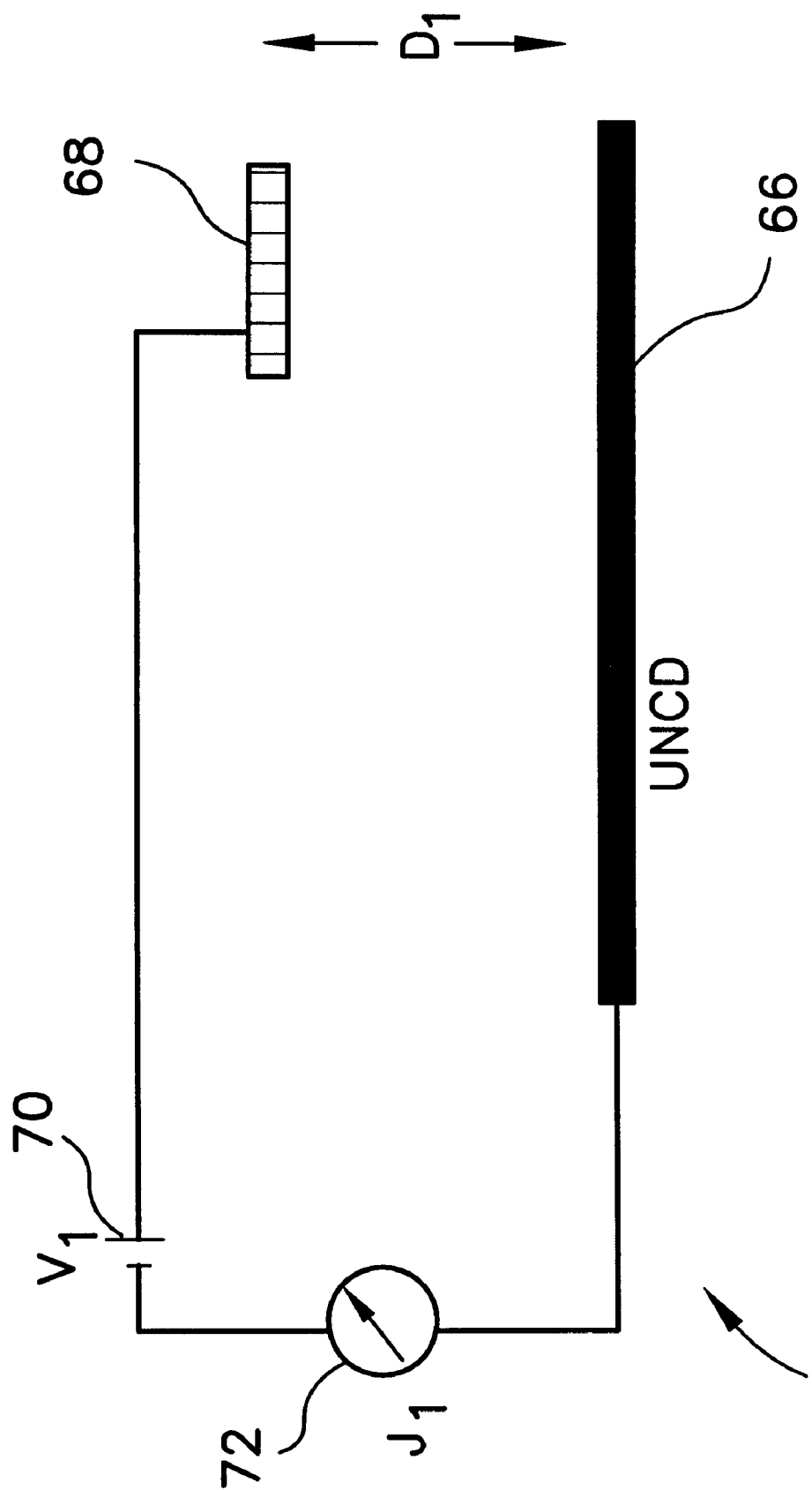
FIG. 5 is a simplified schematic diagram of a sensor circuit incorporating a nanocrystalline diamond cantilever element in accordance with the present invention.
Figure 6:
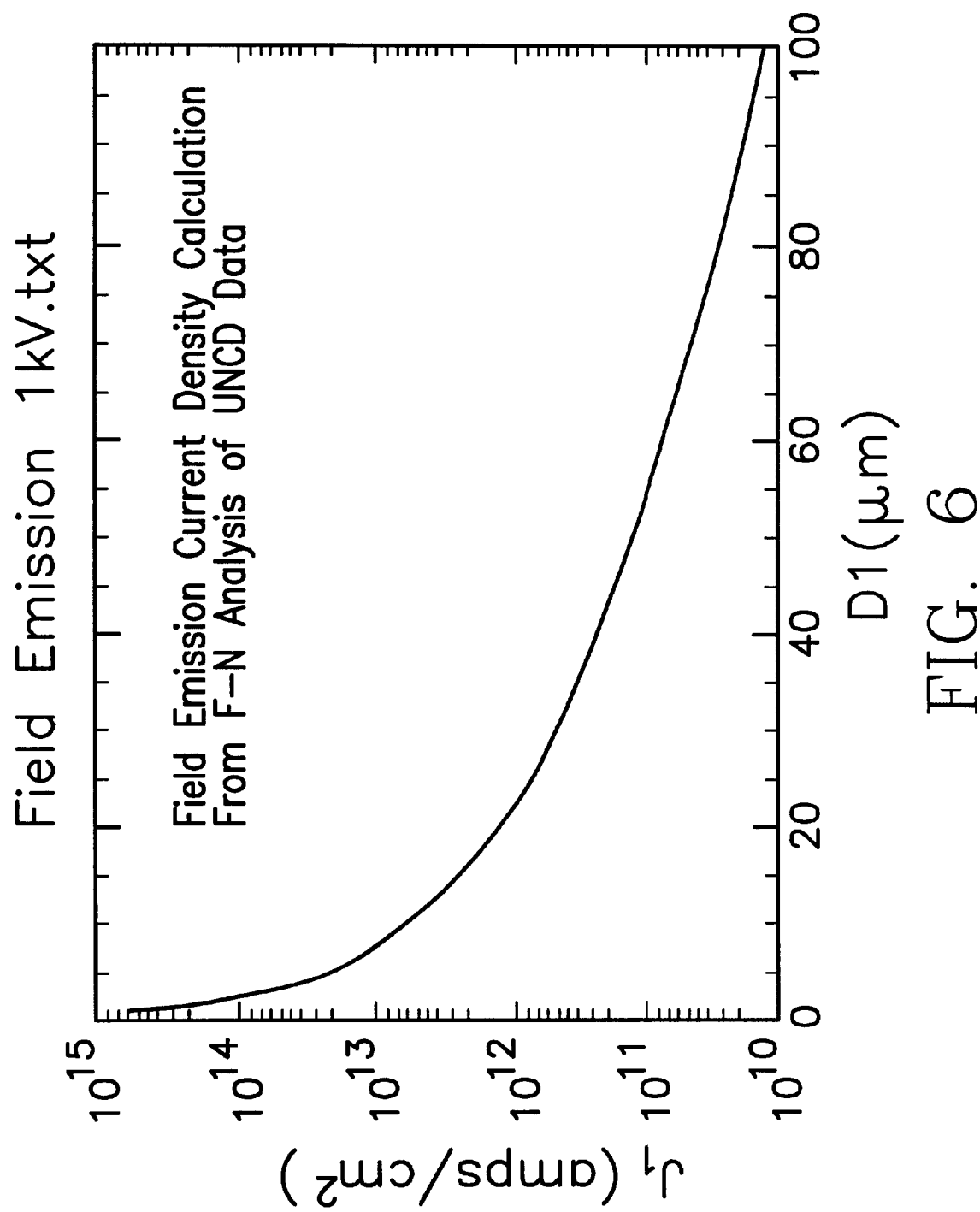
FIG. 6 shows graphically the variation of field emission current density calculated using the Fowler-Nordheim equation as a function of deflection of the nanocrystalline diamond cantilever structure such as in the sensor circuit shown in FIG. 5.

Referring to FIG. 5, there is shown in simplified schematic diagram form another embodiment of an UNCD sensor arrangement 64 in accordance with the present invention. As in the previously described embodiment, UNCD sensor arrangement 64 includes an UNCD cantilever element 66 connected in circuit to a limit electrode 68 by means of a voltage source 70 and an ammeter 72. In the embodiment shown in FIG. 5, voltage source 70 is in the form of a DC voltage source such as a battery. FIG. 6 is a graphic representation of the calculated field emission current density $J_1$ as a function of the separation between UNCD cantilever element 66 and limit electrode 68. The field emission current density calculation shown graphically in FIG. 6 is based upon a Fowler-Nordheim analysis of measured UNCD data.

Figure 7:
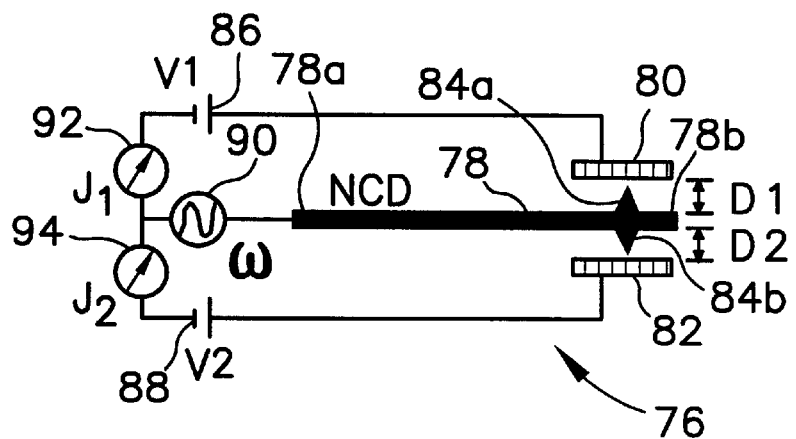
FIG. 7 is another embodiment of a nanocrystalline diamond cantilever structure in a sensor circuit in accordance with the present invention incorporating two anodes with each anode disposed on a respective side of a nanocrystalline diamond cantilever structure.

Referring to FIG. 7, there is shown in simplified schematic diagram form still another embodiment of an UNCD sensor arrangement 76 in accordance with the principles of the present invention. UNCD sensor arrangement 76 includes an UNCD cantilever element 78 having a fixed, stationary end 78a and a free end 78b. The fixed end 78a of the UNCD cantilever element 78 is attached to a support structure, such as a substrate as previously described, while the free end 78b is movable between first and second limit electrodes 80 and 82. By using two electrodes, in this case anodes, on either side of the UNCD cantilever element 78, the UNCD sensor arrangement 76 is capable of simultaneously measuring uniform acceleration, shock, and vibration, and with a slight modification, static pressure and atmospheric shock. A first DC voltage source 86 is connected between the first limit electrode 80 and the UNCD cantilever element 78. A second DC voltage source 88 is connected between the second limit electrode 82 and the UNCD cantilever element 78. The first DC voltage source 86 applies a voltage V1 between the first limit electrode 80 and the UNCD cantilever element 78, while the second DC voltage source 88 applies a voltage of V2 between the second limit electrode 82 and the UNCD cantilever element. First and second ammeters 92 and 94 measure the current respectively between the first limit electrode 80 and the UNCD cantilever element 78 and between the second limit electrode 82 and the UNCD cantilever element. The spacing between the UNCD cantilever element 78 and the first limit electrode 80 is given as D1, while the spacing between the UNCD cantilever element and the second limit electrode 82 is given as D2. The quantity D1+D2 is fixed. A small AC modulation at a frequency $\omega$ is applied to the UNCD cantilever element 78 by means of an AC voltage source 90. The currents $J_1$ and $J_2$ in the first and second circuits respectively including the first and second limit electrodes 80, 82 are respectively given as:

$$J_1 = A(V_1/D_1)^2 \exp(-BD_1/V_1) \quad (3)$$

$$J_2 = A(V_2/D_2)^2 \exp(-BD_2/V_2) \quad (4)$$

Figure 8:
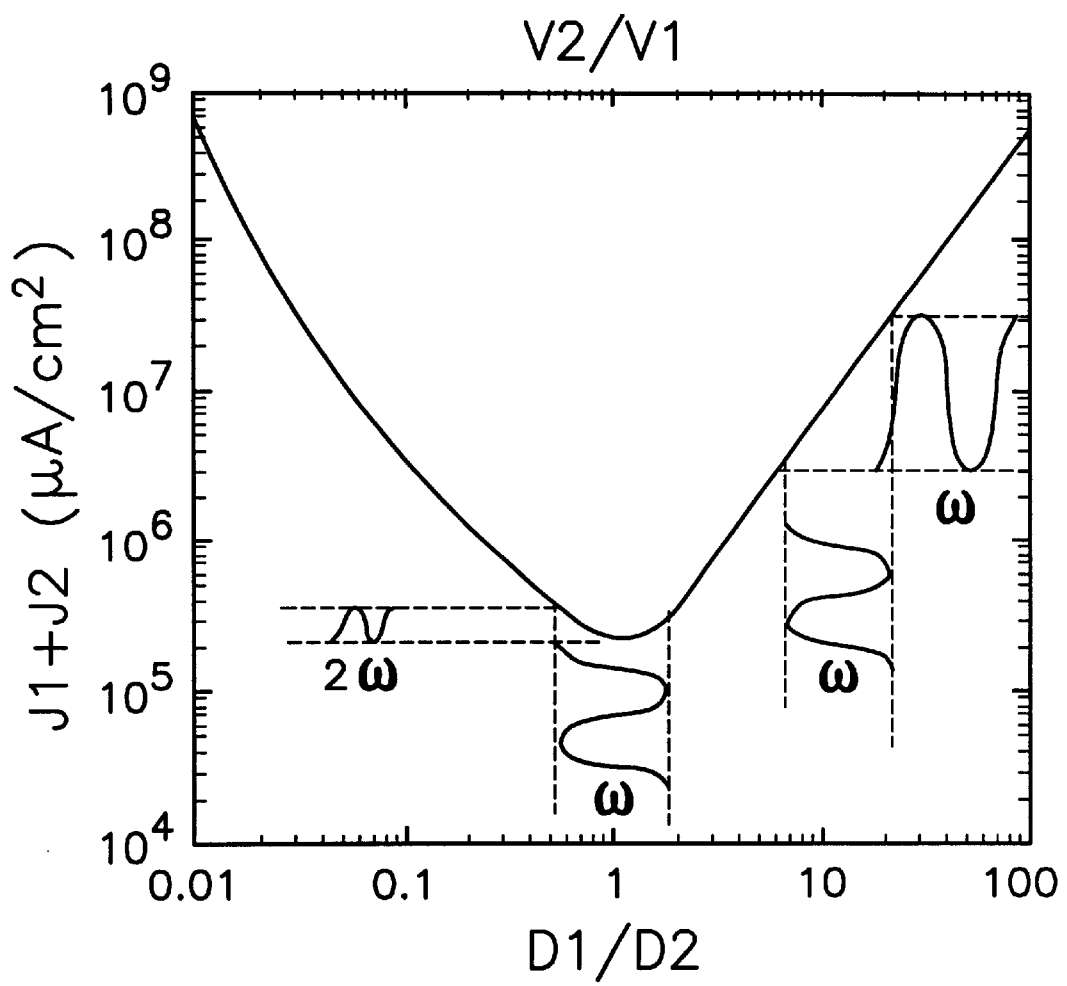
FIG. 8 is a graphic representation of the variation of total current collected by the two anodes in the sensor circuit of FIG. 7 as a function of the variation in the ratio of separation, or displacement, between the two anodes and the nanocrystalline diamond cantilever element.
Figure 9:
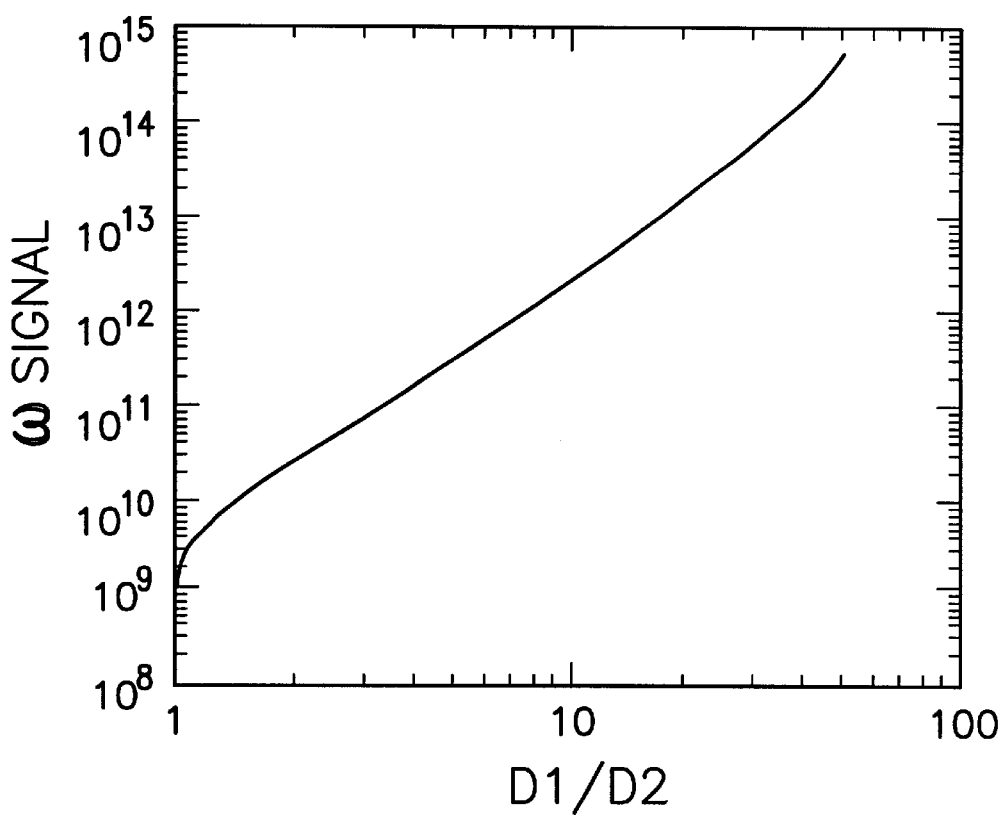
FIG. 9 shows graphically the magnitude of the displacement signal ω as a function of nanocrystalline diamond cantilever element displacement from the equilibrium position.

The parameters A and B have been measured for UNCD films. The total current collected by the first and second limit electrodes 80, 82 is shown graphically in FIG. 8 as a function of the ratio of D1/D2. As shown in FIG. 8, there is a wide dynamic range of both the input displacement D1/D2 and the measured current (J1+J2). Because of the symmetry of the applied voltage and the anode-cathode gap in the Fowler-Nordheim equation, there is a change in the anode voltage ratio V1/V2 that exactly matches any displacement of the UNCD cantilever element 78 from equilibrium. If the V1/V2 ratio is tuned so that the electron emission currents to the two limit electrodes 80, 82 are equal when the UNCD cantilever element 78 is at its equilibrium position, and a small modulation signal having a frequency is applied to the UNCD cantilever element the total current (J1+J2) will be modulated at a frequency 2ω as shown in FIG. 8. A static displacement of the UNCD cantilever element 78 from the equilibrium position will result in an output current with a frequency ω. The phase of this signal will change by 180°, depending on the direction of displacement of the free end 78b of the UNCD cantilever element 78. The amplitude of the w signal as a function of UNCD cantilever element displacement is shown graphically in FIG. 9. The 2ω signals and both phases of the w signals can be independently detected using lock-in techniques.

If the UNCD sensor arrangement 76 shown in FIG. 7 is subjected to symmetric time-dependent displacement, i.e., vibration, then all three signals, i.e., the 2ω signal and both phases of the ω signal, will be detected simultaneously and the amplitudes of the ω and −ω signals will be equal. If there is a component of unidirectional acceleration, then the ω and −ω signals will be unequal and the difference between them is a measure of the acceleration. The sensitivity for small static displacements can be improved further by using a feedback loop to adjust the V1/V2 ratio to equalize the ω signals (and maximize the 2ω signal). The change in DC voltage ratio (V1/V2) required to restore the equilibrium condition (amplitude of +ω and −ω signals equal) can be related to the static displacement via the Fowler-Nordheim equation.

Figure 10:
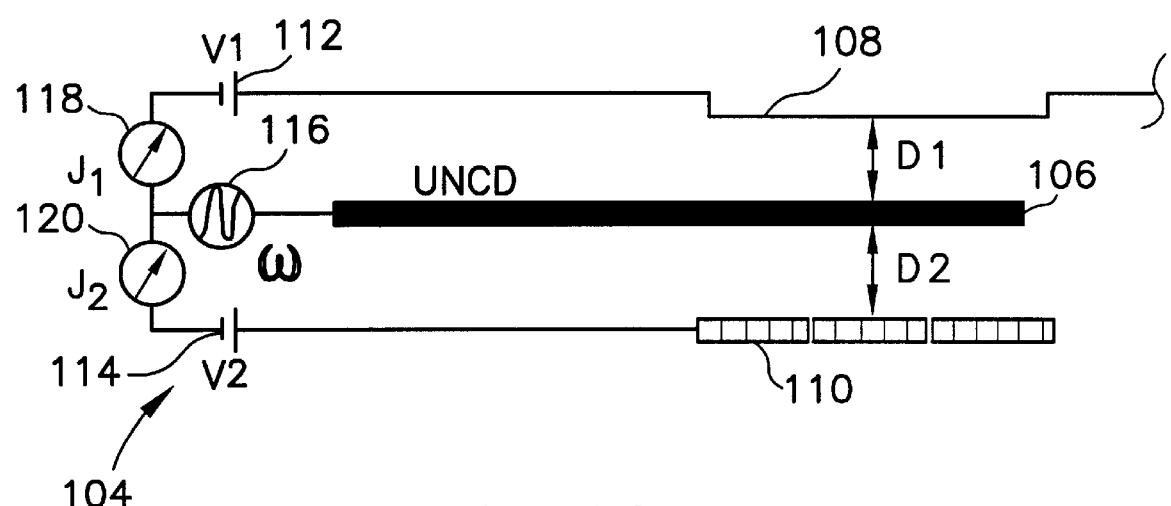
FIG. 10 is a simplified schematic diagram of another embodiment of a nanocrystalline diamond cantilever sensor arrangement in accordance with the present invention incorporating a flexible membrane which is particularly adapted for pressure and shock wave measurements.

If the UNCD device is subjected to a shock wave, then there will be an initial displacement in one direction, followed by a damped oscillation. Time-stamped sample and hold circuitry for measurement of the three signals can be used to determine the duration and intensity of the shock wave. Finally, by allowing one of the anodes, e.g., the one at potential V1, to be positioned on a movable diaphragm, the device can be made sensitive to atmospheric pressure variations which will change D1, but not D2. A device in accordance with this aspect of the present invention for measuring atmospheric pressure variations is shown in simplified schematic diagram form in FIG. 10. The UNCD pressure/shock wave sensor arrangement 104 shown in FIG. 10 includes an UNCD cantilever element 106 disposed between a first flexible membrane electrode 108 and a second limit electrode 110. As in the previously described embodiment, the UNCD pressure/shock wave sensor arrangement 104 further includes first and second DC voltage sources 112 and 114 and first and second ammeters 118 and 120. An AC voltage source 116 is connected to the UNCD cantilever element 106. The small size and high component stiffness of the UNCD pressure/shock wave sensor arrangement 104 provides extremely good high frequency response and good time resolution.

As shown in FIG. 7, the free end 78b of the UNCD cantilever element 78 may be formed with symmetric diamond tips 84a and 84b disposed in facing relation to the first and second limit electrodes 80, 82, respectively. The diamond tips 84a and 84b terminate in a very small radius of curvature, resulting in an enhancement of the electric field and a consequent reduction in the required values of $V_1$ and $V_2$. The electrode spacings $D_1$ and $D_2$ are measured from the end of the diamond tip to the respective anode.

In another application, the lower tip in FIG. 7 can be used as the probe of a scanning atomic force microscope (AFM). In this application, the lower electrode is replaced by the sample to be characterized, and the lower tip is brought into contact with the sample, and the $V_2$ power supply 88 is not used. The $V_1$ power supply 86, the cantilever element 78 and the upper electrode 80 form a single-sided field emission position sensor as shown in FIG. 5. The free end of the upper side of the cantilever element 78 may be flat as shown in FIG. 5, or formed with a sharp tip as shown in FIG. 7. This design permits the fabrication of an AFM as a single, compact, pre-aligned structure.

There has thus been shown an ultrananocrystalline diamond (UNCD) cantilever wide dynamic range acceleration/vibration/pressure sensor, and method of fabrication therefore, which can also be used as a precise, alignment-free readout of the cantilever deflection in atomic force microscopes. Cantilever deflection, and thus the extent of vibration, acceleration, and pressure, can be detected using either capacitative, interferometric or electron emission methods. Using the latter readout method, the entire UNCD cantilever structure and readout mechanism can be fabricated as a single, compact, pre-aligned structure capable of undergoing large displacements without breaking the cantilever element. The sensor is highly sensitive over a wide dynamic range and is very small and compact in size making the sensor particularly adapted for use in micro electro mechanical systems (MEMS) and other devices.

While particular embodiments of the present invention have been shown and described, it will be obvious to those skilled in the relevant art that changes and modifications may be made without departing from the invention in its broader aspects. Therefore, the aim in the appended claims is to cover all such changes and modifications as fall within the true spirit and scope of the invention. The matter set forth in the foregoing description in accompanying drawings is offered by way of illustration only and not as a limitation. The actual scope of the invention is intended to be defined in the following claims when viewed in their proper perspective based on the prior art.

We claim:

1. A sensor for measuring an acceleration, vibration or pressure, said sensor comprising:
    a substrate having a general flat surface;
    an ultrananocrystalline diamond (UNCD) element having first and second opposed ends, wherein said UNCD element undergoes deflection from an equilibrium position in response to acceleration, vibration or pressure;
    a mounting member disposed between and coupled to said substrate and the first end of said UNCD element for attaching said UNCD element to said substrate in a cantilever manner, wherein the second opposed end of said UNCD element is deflected from said equilibrium position toward or away from said substrate in response to an acceleration, vibration or pressure; and
    detector means coupled to said UNCD element for measuring deflection of said UNCD element from said equilibrium position, wherein said deflection represents an acceleration, vibration or pressure experienced by said UNCD element.

2. The sensor of claim 1 wherein said substrate is silicon and said mounting member is comprised of an electrical insulating material.

3. The sensor of claim 2 where said electrical insulating material is a thermally oxidized silicon wafer.

4. The sensor of claim 1 wherein said detector means comprises an optical apparatus for measuring the deflection of said UNCD element from said equilibrium position.

5. The sensor of claim 4 wherein said optical apparatus includes an interferometer for measuring a change in phase of a light beam incident upon the second end of said UNCD element.

6. The sensor of claim 1 wherein said detector means comprises an electrical circuit coupled to said UNCD element and to said substrate for measuring a cold cathode electron emission current from said UNCD element generated in response to an acceleration, vibration or pressure.

7. The sensor of claim 6 wherein said electrical circuit includes an AC voltage source and an ammeter.

8. The sensor of claim 6 wherein said electrical circuit includes a DC voltage source and an ammeter.

9. A sensor for simultaneously measuring acceleration, shock and vibration, said sensor comprising:

an ultrananocrystalline diamond (UNCD) element responsive to acceleration, shock and vibration exerted thereon, wherein said UNCD element includes a first end fixedly mounted to a support member and a second opposed cantilever free end, and wherein said UNCD element undergoes deflection from an equilibrium position in response to an acceleration, shock or vibration exerted thereon;

first and second electrodes connected in circuit with said UNCD element and disposed on opposed sides of the second free end of said UNCD element and respectively spaced distances D1 and D2 from said UNCD element;

first and second DC voltage sources for applying first and second DC voltages V1 and V2 and providing currents J1 and J2 between said UNCD element and said first and second electrodes, respectively;

an AC modulation source coupled to said UNCD element for applying an alternating voltage modulated at a frequency w to said UNCD element; and circuit means for measuring a change in J1/J2 representing displacement of said UNCD element from said equilibrium position and a magnitude of an acceleration, shock and vibration exerted on said UNCD element.

10. The sensor of claim 9 wherein said UNCD element is a cathode and said first and second electrodes are anodes in the circuit.

11. The sensor of claim 9 wherein the currents in said first and second electrodes are $J_1$ and $J_2$, respectively, and wherein $J_1+J_2$ is a function of the ratio of D1/D2.

12. The sensor of claim 11 wherein a change in the ratio of V1/V2 corresponds to displacement of said UNCD element from said equilibrium position.

13. The sensor of claim 12 wherein an amplitude of the alternating current modulated at the frequency $\omega$ changes with a change in the ratio of D1/D2.

14. The sensor of claim 9 further comprising a movable diaphragm attached to and supporting said first electrode for measuring atmospheric pressure variations.

15. The sensor of claim 14 wherein said movable diaphragm is a flexible membrane.

* * * * *

UNITED STATES PATENT AND TRADEMARK OFFICE
CERTIFICATE OF CORRECTION

PATENT NO.    : 6,422,077 B1
DATED         : July 23, 2002
INVENTOR(S)   : Krauss et al.

It is certified that error appears in the above-identified patent and that said Letters Patent is hereby corrected as shown below:

Column 7,
Line 11, after "a frequency" add -- ω --
Line 19, change "w" to -- ω --
Line 21, change "w" to -- ω --

Column 10,
Line 7, change "w" to -- ω --

Signed and Sealed this

Twenty-ninth Day of October, 2002

Attest:

JAMES E. ROGAN
*Director of the United States Patent and Trademark Office*

*Attesting Officer*